United States Patent [19]

Wojslawowicz

[11] 4,146,826
[45] Mar. 27, 1979

[54] GTO BI-DIRECTIONAL MOTOR CONTROL CIRCUIT

[75] Inventor: Jack E. Wojslawowicz, Bayonne, N.J.

[73] Assignee: RCA Corporation, New York, N.Y.

[21] Appl. No.: 742,068

[22] Filed: Nov. 15, 1976

[30] Foreign Application Priority Data

Jan. 26, 1976 [GB] United Kingdom ............... 02970/76

[51] Int. Cl.$^2$ ............................................. H02P 1/08
[52] U.S. Cl. .................................. 318/297; 318/300; 307/10 R; 307/115; 307/252 C
[58] Field of Search ....................... 318/267, 291–294, 318/296, 297, 300, 549; 49/139; 307/113, 115, 9, 10 R, 252 C

[56] References Cited

U.S. PATENT DOCUMENTS

| | | | |
|---|---|---|---|
| 3,147,423 | 9/1964 | DuRocher | 307/115 |
| 3,229,181 | 1/1966 | Evans | 318/293 |
| 3,302,090 | 1/1967 | Rayfield | 318/297 |
| 3,519,907 | 7/1970 | White | 318/297 |
| 3,588,656 | 6/1971 | Shofner | 318/293 |
| 3,688,173 | 8/1971 | Ballou | 318/267 |
| 3,694,715 | 9/1972 | Van der Linde | 318/300 |
| 3,697,846 | 10/1972 | Mueller | 307/115 |
| 3,928,775 | 12/1975 | Steigerwald | 307/252 C |
| 4,044,286 | 8/1977 | Adams | 318/297 |

Primary Examiner—Robert K. Schaefer
Assistant Examiner—William L. Feeney
Attorney, Agent, or Firm—H. Christoffersen; A. L. Limberg; J. M. O'Meara

[57] ABSTRACT

Gate-turn-off silicon controlled rectifiers (GTO's) are selectively rendered conductive to control the direction of rotation of a bi-directional motor. To this end a digital logic network is responsive to either one or both of a pair of remotely located switches being operated to either a first or a second condition, for controlling a transistorized gate signal generating network to apply an operating voltage to the gate electrode of the appropriate one(s) of the GTO's. The gate signal generating network includes circuitry for grounding the gates of the GTO's, turning them off if on and thereby inhibiting operation of the motor, whenever either of two operating conditions obtains. The first of these conditions occur when the switches are operated sequentially to be concurrently one in the first condition and the other in the second condition, and the second of these conditions is when one of the switches is returned from the first or second condition to a neutral condition with the other switch being in the neutral condition.

33 Claims, 3 Drawing Figures

GTO BI-DIRECTIONAL MOTOR CONTROL CIRCUIT

The field of the present invention relates generally to a control circuit for operating a motor, and more specifically to a circuit for operating a bi-directional motor from either of two switches remotely located from the motor.

It is known to use mechanical or electromechanical switching networks for controlling the operation of bidirectional motors that raise or lower "power windows" in an automobile, for example. Usually a switch located at each one of three passenger positions permits each passenger to control the lift motor of his window, and a bank of switches located at the driver's position permits him to control the lift motors of his window and those of the passengers'. The problem with such circuits is that the mechanical switch contacts must be capable of carrying the rather substantially high magnitude motor currents, and the large-gauge wires required to conduct the motor currents from the switches to the motor make the cable harnesses into which they are bound bulkier than desired. Also, the electric motor presents an inductive load, and the initial energization of the motor tends to draw very high magnitude currents, equivalent in magnitude to the locked-rotor current of the motor, causing arcing across the switch contacts. This arcing tends to rapidly pit and erode the contacts, causing a reliability problem.

The present invention overcomes the problems in the prior art by switching the operating current of each window motor via controlled rectifiers located near the motor. The mechanical switches at each window position, which may correspond with those in the prior art, are only called upon to switch relatively small control currents as compared to the motor currents, and may therefore be made much smaller and cheaper while avoiding the contact erosion problems that adversely affected prior art power-window systems. Certain control wires conduct control currents from the operator-actuated switches to a digital logic network used to selectively energize a transistorized switching network used to generate gate signals for the controlled rectifiers, and other control wires conduct the gate signals to the controlled rectifiers. These control wires can be made relatively small gauge as compared to the wires required for conducting motor currents because of the relatively low magnitude of control and gate-signal currents involved, substantially reducing the bulk of the power-window cable harnesses.

Figure 1:
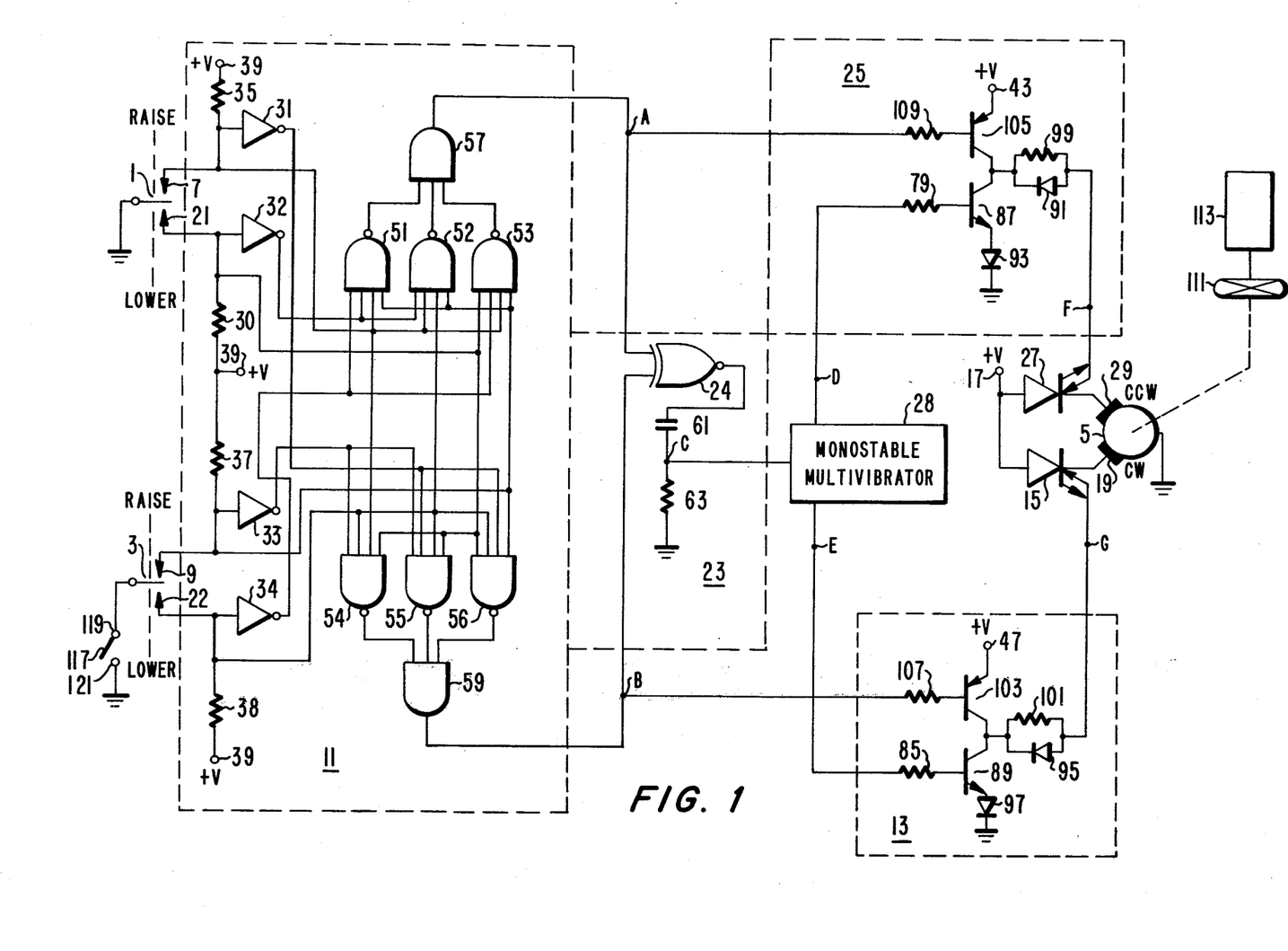
FIG. 1 is a schematic diagram of a bi-directional motor control circuit, embodying the present invention.

With reference to FIG. 1, a pair of switches 1, 3, which may be remotely located from one another and from motor 5, are used to each provide independent control of the operation of the motor 5. For example, switches 1 and 3 may be located at the driver's and a passenger's positions in the automobile, each switch providing for control of the raising and lowering of the passenger's window 113 by motor 5. Motor 5 is shown as being of the sort having a split-wound field, positive current being alternatively applied to one of the field windings via terminal 19 causing rotation of motor 5 in a sense to raise the window or to the other of the field windings via terminal 29 causing rotation of motor 5 in the opposite sense to lower the window. The motor 5 drives a shaft for operating a gear box 111 in controlling the raising and lowering of a window 113 mechanically linked to the gear box 111. As will be described in greater detail, assuming switch 117 is closed (its pole connected between contacts 119 and 121), when switches 1 or 3, are individually or simultaneously operated to move their poles to their respective upper contacts 7 and 9, the passenger's window 113 is raised as follows. The logic or decoding network 11 responds to the switch so moved to apply a control signal (at point B) to gate signal generator network 13. Gate signal generator network 13 responds in turn to provide a turn-on signal to a GTO 15. The anode-cathode path of GTO 15 is rendered conductive, permitting current to flow from the positive voltage supply terminal 17 to terminal 19 of the motor 5, causing the motor to raise the window 113.

Whenever switches both 1 and 3 are released, permitting their respective poles to occupy neutral positions between their respective pairs of contacts 7, 21 and 9, 22 motor 5 will be permitted to stop. The logic network 11 will respond by changing the state of its output signals, in turn operating a gating and differentiating network 23 for triggering a monostable multivibrator network 28. The output signal (at points D, E) of this multivibrator network 28 has a predetermined time duration, and is applied to gate signal generators 13 and 25, for operating them to apply a turn-off or grounding signal to the gate electrode of each one of the GTO's 15 and 27. As a result, GTO 15 will turn off, substantially increasing the impedance between its anode and cathode electrode current paths, thereby preventing the further flow of current to the motor 5, permitting it to coast to a stop due to the frictional engagement of its associated mechanical members. GTO 27, which has been non-conductive is, of course, unaffected by the turn-off signal applied to its gate electrode.

Similarly, if either or both of switches 1 and 3 are operated to place their poles into electrical contact with their lower contacts 21, 22, respectively, logic network 11 will respond by applying a control signal (at point A) to gate signal generator network 25, to operate that generator network 25 for applying a turn-on signal to the gate electrode of GTO 27, for placing GTO 27 into conduction and so permitting current to flow from positive voltage supply terminal 17 to terminal 29 of motor 5 causing the motor to lower the window 113. Permitting both switches 1 and 3 to return to their neutral positions (one may have been in its neutral position), as before applies a turn-off signal to the gate electrode of GTO's 15 and 27, in this instance turning off GTO 27 to let motor 5 stop.

If both GTO's 15 and 27 are simultaneously activated, the motor 5 will stop due to the resultant opposing fields formed by its windings. When the motor so stops, the back emf (electromagnetic field) normally developed in a running motor, which tends to limit the flow of current in the field windings, is lost, leaving only the low winding resistance of each field winding (about 0.2 ohms), to limit the flow of current between motor terminals 19 and 29 and ground. Consequently, high magnitude currents may flow through the main conduction paths of the GTO's 15 and 27, destroying them, and possibly damaging the motor. Accordingly, to protect against such damage, if switches 1 and 3 are sequentially operated, first one to begin operation of the motor 5 to raise the window 113, and then the other to in an attempt to operate the motor 5 in an opposite direction to lower the window 113, or vice versa, the logic network 11 responds by discontinuing the supply of any control signal at points A or B, thereby suppressing gate signal generators 13 and 25 from applying turn-on signals to either of the gate electrodes of GTO's 15 and 27. Differentiating network 23 responds to the termination of a control signal at A or B, by applying a triggering signal to monostable multivibrator network 28, which is triggered to provide motion inhibit signals at points D and E. In response to the motion inhibit signals, the gate signal generators 13 and 25, in turn operate to apply a turn-off or grounding signal to the gate electrodes of GTO's 15 and 27, preventing their conduction whether simultaneous or not. If switches 1 and 3 are simultaneously operated one to the "raise" position and the other to the "lower" position, the logic network 11 responds by maintaining a high level control signal at points A and B, thereby suppressing gate signal generators 13 and 25 from applying turn-on signals to either of the gate electrodes of GTO's 15 and 27.

Each of the passenger windows of an automotive vehicle may be provided with a system as shown in FIG. 1. The driver window may be provided with a similar system simplified in that the driver's switch can be directly connected to the gate electrodes of the GTO's controlling his lift motor, for controlling the operation of the GTO's. Switches 1 and 3 can each be of the single-pole-double throw with neutral position type or of the push momentary type, for example. The FIG. 1 circuit is not limited for application to window lift mechanisms of automotive vehicles, but is generally adaptable for use in controlling a bidirectional motor from either one of two remotely located switching positions.

The operation of the bi-directional motor control circuit shown in FIG. 1 will now be described in greater detail. The inverters 31–34 of logic network 11, each have an input terminal connected via individual pull-up resistors 35–38, respectively, to a terminal 39 for receiving an operating voltage +V, to insure that the output signal from each one of the inverters 31–34 is low in the absence of a grounded input terminal. It should be noted that switch 117 is included at the driver's position, for permitting him to disable the passenger's switch 3 for raising or lowering window 113, by operating switch 117 to disconnect its pole from contact 121, opening the conduction path between the pole of passenger switch 3 and ground. For the purposes of the following description, it is assumed that switch 117 is closed, enabling operation of passenger switch 3, for controlling movement of window 113.

Assume, for the purpose of discussion, the GTO's 15 and 27 are initially turned off, and motor 5 is stopped. If the operating voltage +V is applied to terminals 39, 17, 41, 43, 45, 47, and 49 shown in FIGS. 1 and 2, owing to switches 1 and 3 each being in their neutral position, the output signals from each of the inverters 31–34 will be low (indicative of a digital zero, in this example), and the voltage level at each of the switch contacts 7, 21, 9, 22 will be high (indicative of a digital 1, in this example). These output signals and voltage levels are selectively applied to certain of the input terminals of NAND gates 51–56, causing each of the NAND gates to produce an output signal that is high. Since the output signals of NAND gates 51–53 are applied as individual input signals to AND gate 57, AND gate 57 will operate to produce a high level signal at A. Similarly, the output signals from NAND gates 54–56 are applied as input signals to AND gate 59, causing it to produce a high-level signal at point B. When the voltage levels at points A and B initially go high, the output signal from the exclusive NOR gate 24 will go high and be differentiated by the differentiating network comprising series-arm capacitor 61 and shunt-leg resistor 63. This differentiated output signal appears initially as a positive-going spike at the common connection C between capacitor 61 and resistor 63, and is applied as a triggering signal to an input terminal of a monostable multivibrator circuit 28.

Figure 2:
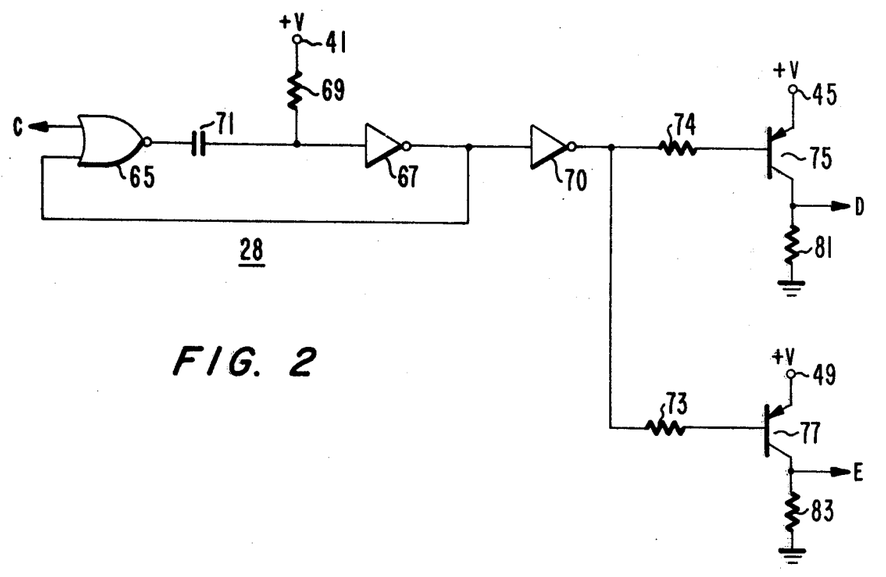
FIG. 2 is a schematic diagram of a monostable multivibrator network with a buffered output stage, suitable for use in the FIG. 1 embodiment of the present invention.

The monostable multivibrator circuit 28 responds by providing high level output signals approaching +V, at points D and E. These signals are coupled via resistors 79 and 85, from points D and E, respectively, to the base electrodes of transistors 87, 89, respectively, for turning them on. FIG. 2 shows a representative structure for monostable multivibrator circuit 28 including NOR gate 65, the RC timing circuit of capacitor 71 and resistor 69, and terminal 41 for receiving operating voltage +V. Inverter 70 is used to invert the output signal from this monostable multivibrator, for driving a pair of buffer switching stages 74, 75, 81, 45 and 73, 77, 83, 49.

When transistor 87 is switched on, the impedance between its collector-emitter current path will go from a relatively high to a relatively low value, thereby completing a relatively low-impedance current path between the gate electrode of GTO 27 and ground, such current path also including a shunt diode 91 and a blocking diode 93. Similarly, when switching transistor 89 switches on, a low-impedance current path including shunt diode 95, the collector-emitter current path of transistor 89, and blocking diode 97, is established between the gate electrode of GTO 15 and ground. In other words, switching transistors 87 and 89 are turned on to provide turn-off signals at the gate electrodes of GTO's 27 and 15, respectively, to insure that these GTO's are turned off. It should be noted that a characteristic of a GTO is that once a positive pulse signal is applied to the gate electrode of a GTO for turning the GTO on, the GTO will remain on despite the termination of the positive turn-on signal at its gate electrode, until such time that a ground or negative going pulse signal is applied to the gate electrode for turning the GTO off. In this example, the turn off signal will be applied to the gate electrodes of GTO 27 and 15, for a period of time equivalent to the timing period of the monostable multivibrator network 28. This period is chosen sufficiently long — e.g. about 200 microseconds — to insure that GTO's 15 and 27 will turn off. When this multivibrator network 28 resets, the output signals at points D and E will again go low, switching transistors 87 and 89 off, interrupting the low-impedance current paths from the gate electrodes of the GTO's 27, 15 to ground, and so ending application of turn off signal to these electrodes.

Shunt diodes 91 and 95 are included in gate signal generating networks 25, 13, respectively, to insure that the turn off currents flowing from the gate electrodes of the GTO's 27, 15, respectively, are not restricted in amplitude by the resistances of current-limiting resistors 99, 101, respectively, used to restrict gate current during turn-on. Blocking diodes 93 and 97, prevent transistors 87 and 89, respectively, from being placed in reverse-breakdown due to the back emf of the motor 5 and undesirably completing paths for the flow of turn-on currents to the gate electrodes of GTO's 15 and 27.

Once monostable multivibrator network 28 has reset itself, it can be retriggered into its instable state, whenever the output signal from exclusive NOR gate 24 goes from low to high value. The output signal of exclusive NOR gate 24 is high when the voltage levels at points A and B are both high or both low, and is low when one of the voltage levels at points A and B is high while the other is low. Once the output signal from the exclusive NOR gate 24 has gone high causing the differentiating network capacitor 61 and resistor 63 to apply a triggering pulse to the monostable multivibrator circuit 28 (from point C), a new triggering signal will not be applied to the multivibrator circuit if the output signal from the exclusive NOR gate 24 remains high after the multivibrator 28 resets itself. This is because capacitor 61 assumes a charge after the triggering of the multivibrator circuit. When the voltage levels at points A and B are changed so one is high and the other is low, the exclusive NOR gate 24 will respond by changing the state of its output signal from a high value to a low value, thereby discharging any charge on capacitor 61. Thereafter, the monostable multivibrator circuit 28 can again be triggered via the differentiating network 23 and resistor 63 as previously described. Therefore, if the levels of the signals or voltages at points A and B remain both high or both low after the cycling and resetting of the monostable multivibrator network 8, the charging of capacitor 61 prevents successive retriggering of the multivibrator circuit that would lead to an undesirable oscillator-like mode of operation.

With switch 3 in its neutral position and switch 1 placed in its window-raising position with its pole at contact 7, the voltage level at contact 7 will go low, responsive to which the output signal from inverter 31 will go to a high level, the other signal states of the circuit remaining as described for both switches 1 and 3 being simultaneously in the neutral position. When switch 1 is placed in its raise position, the levels of the input signals applied to NAND gates 51-53 will be such that the levels of the output signals of these NAND gates will each be high, causing AND gate 57 to produce a high level output signal at point A. At the same time the level of the output signals from NAND gates 54 and 55 will each be high, and the level of the output signal from NAND gate 56 will be low, causing AND gate 59 to provide a low level output signal at point B. The low level output signal at point B is applied via resistor 107 to the base electrode of transistor 103 to switch it on. As a result, a positive voltage is applied to the gate electrode of GTO 15, and current flows from terminal 47 through the current path including the emitter-collector path of transistor 103 and current-limiting resistor 101, into the gate electrode of the GTO 15. This turns on GTO 15, reducing the impedance between its anode and cathode electrode from relatively high to relatively low value, permitting current to flow from terminal 17 into the power terminal 19 of motor 5 and energize the field winding of the motor 5 that causes clockwise rotation of its rotor. If switch 1 is now operated to place its pole in the neutral position, the output signal from NAND gate 56 will go from low to high level, causing AND gate 59 to now produce a high level signal at point B that switches transistor 103 off, so that no turn-on current is applied to GTO 15. As previously described, with point A initially at a high level and point B initially at a low level, if point B is thereafter raised to a high level of voltage, the exclusive NOR gate 24 responds by applying a high level signal to the differentiating network of capacitor 61 and resistor 63, for triggering the monostable multivibrator circuit 28, grounding the gate electrodes of the GTO 27 and 15, thereby applying turn off signal to GTO 15 to halt its conduction.

If switches 1 and 3 are both placed in window-raising positions with their respective poles at contact 7 and at contact 9, the input signals applied to NAND gates 51-56, cause the output signals from NAND gates 51-54 and 56 to all be at a high level, and the output signal from NAND gate 55 to be at a low level. Accordingly, NAND gate 57 in response to the output signals from NAND gates 51-53, provides a high level output signal at point A, whereas AND gate 59 in response to the level of the output signals from NAND gates 54-56, provides a low level output signal at point B. Transistor 103 is turned on in response to the low level signal at point B, causing a positive or turn on voltage to be applied to the gate electrode of GTO 15, turning it on and causing the motor 5 to rotate in a clockwise direction and raise the window.

If both switches 1 and 3 are now returned to their neutral conditions, the voltage level at point B goes from a low level to the high level, whereas the voltage at point A remains at a high level, causing the monostable multivibrator network 28 to be triggered into operation, for turning off GTO 15 as previously described and permitting motor 5 to stop so the window retains its position.

The operation for the condition where switch 1 is retained in the neutral condition, and switch 3 is then placed in its window-raising position with its pole at contact 9, can be described by syntactic similarity to the operation for the condition where switch 1 is placed in its window-raising position with its pole at contact 7, by substituting reference numerals 3, 9, 33, 56, 54 for 1, 7, 31, 54, 56, respectively.

If switch 1 is left in its neutral condition, and switch 3 is placed in its window-lowering position with its pole at contact 22, the input signals applied to NAND gates 51-56 cause the output signals from NAND gates 51, 52, and 54-56 to be at a high level, and the output signal from NAND gate 53 to be at a low level. In response to the level of the output signals from NAND gates 54-56, AND gate 59 produces an output signal at point B having a high level, whereas AND gate 57 in response to the levels of the output signals from NAND gates 52-53, provides an output signal at point A having a low level. The low level signal at point A is applied to the base electrode of transistor 105 via resistor 109, switching transistor 105 on, for applying a positive voltage to and permitting current to flow into the gate electrode of GTO 27 via the conduction path through the collector-emitter current path of transistor 105 and resistor 99. In response to the gate current, GTO 27 will turn on, permitting current to flow from the positive voltage +V at terminal 17, through the anode-cathode current path of GTO 27, into the power terminal 29 of motor 5, and through the counterclockwise field winding of this motor to a point of reference potential, ground in this case. The motor 5 rotates counterclockwise, lowering the window 113.

When the pole of switch 3 is returned to the neutral condition, as previously described, with switch 1 remaining in the neutral condition, the voltage level at point A will go high, triggering the monostable multivibrator network 28 for operating the gate signal generator networks 13 and 25, to ground the gate electrodes of GTO's 27 and 15, applying a turn-off signal to the gate electrode of GTO 27. GTO 27 is turned off, permitting motor 5 to stop.

Placing both switches 1 and 3 in their window-lowering positions with their poles at contacts 21 and 22, respectively, causes the level of the signals applied to the input terminals of NAND gates 51–56 to be such that the output signals from NAND gates 52–56 will be at a high level, whereas the output signal from NAND gate 51 will be at a low level. The response of the remainder of the circuit can be described by syntactic similarity to the operation for the previously described condition where switch 1 has its pole in a neutral position, and switch 3 is operated to place its pole at contact 22 for lowering window 113.

The operation for the condition where switch 3 is retained in its neutral condition, and switch 1 is placed in its window-lowering position with its pole at contact 21, can be described by syntactic similarlity to the operation for the condition where switch 1 is in its neutral condition and switch 3 has its pole at contact 22, substituting reference numerals 1, 53 for 3, 52, respectively.

If switches 1 and 3 are perchance operated simultaneously, one for clockwise rotation of the motor and the other for counterclockwise rotation of the motor, the level of the input signals applied to the NAND gates 51–56 will be such that all the output signals from these NAND gates will be at a high level. AND gate 57 in response to the high level of output signals from NAND gates 51–53 will provide a high level of output signal at point A, and AND gate 59 in response to the high level of output signals from NAND gates 54–56 will provide a high level of output signal at point B. The gate signal generators 13 and 25 will remain inoperative or nonresponsive to the high levels of signals at points A and B, and as a result the motor 5 will remain de-energized.

With switch 3 in its neutral condition, if switch 1 is placed in its window-raising position with its pole at contact 7, which normally causes clockwise rotation of the motor 5, as previously described the level of the resultant output signal at point B will be low for operating gate signal generator 13 to apply a turn on voltage to the gate electrode of GTO 15, for turning on this GTO to obtain clockwise rotation for operation of the motor 5. If subsequent to switch 1 being placed in its window-raising position, switch 3 is placed in its window-lowering position with its pole at its contact 22, which normally causes counterclockwise rotation of the motor 5, and at the same time switch 1 is kept in its window raising condition, the voltage level of the input signals applied to the NAND gates 51–56 will be such that the output signals from these NAND gates will now all have a high level. Accordingly, AND gate 59, in response to the high levels of output signals from NAND gate 54–56, will raise the level of its output signal from low to high at point B, while AND gate 57 will maintain the level of the output signal at point A at a high level, in response to the high levels of output signals from NAND gates 51–53. As previously mentioned, the differentiating network will apply a triggering signal to the monostable multivibrator network 28, in response to the level of the signal at point B going from a low level to a high level, while the level of the signal at point A remains high. In turn, the monostable multivibrator 28 is triggered to apply high level output signals at points D and E to operate gate signal generators 13 and 25, for applying turn off signals to the gate electrodes of the GTO's 15, 27, thereby turning off GTO 15, stopping operation of the motor 5. When the level of the output signal from AND gate 59 provided to point B is high, transistor 103 of switching network 13 is turned off, terminating the turn on or positive voltage applied to the gate electrode of GTO 15. An identical result as just described is obtained if switch 1 is retained in a neutral condition, and switch 3 is operated to place its pole at its contact 9 for clockwise rotation of the motor, and subsequently switch 1 is operated to place its pole at contact 21 for counterclockwise rotation of the motor.

With switch 3 retained in its neutral condition, if switch 1 is placed in its window-lowering position with its pole at contact 21, the level of the output signal or voltage at point A will be low, whereas the level of the signal at point B will be high. The operation for the condition where subsequent to such operation of switch 1, switch 3 is operated to place its pole in its raise position at contact 9 for clockwise rotation of the motor 5, can be described by syntactic similarity to the operation for the condition where switch 3 is first operated for placing its pole at contact 7 (with switch 3 in its neutral condition), and subsequently switch 3 is operated to the condition where its pole is at its contact 22, by substituting reference numerals 51, 52, 53, 57, 59, for 54, 55, 56, 59, 57, respectively.

Figure 3:
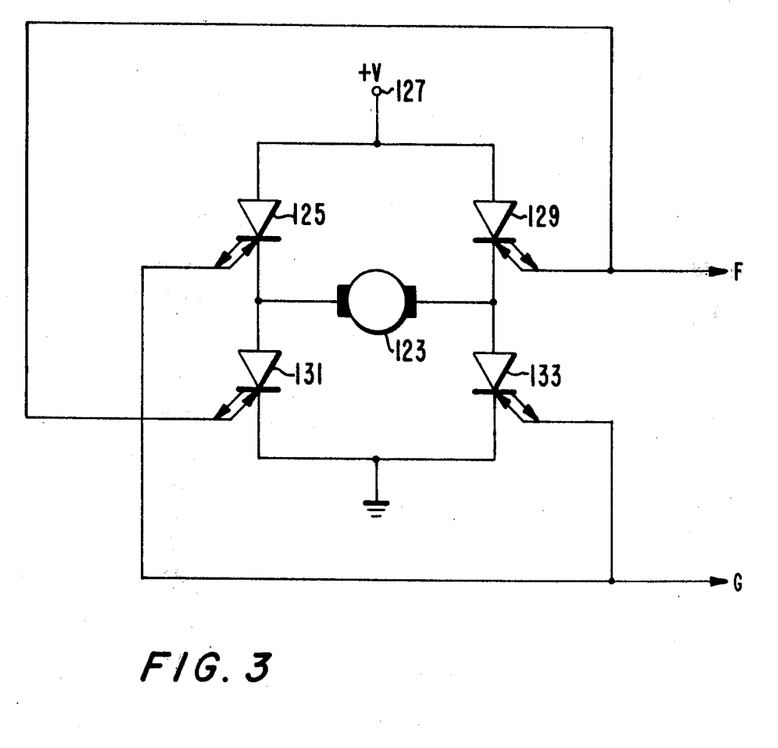
FIG. 3 is a schematic diagram of a modification that can be made to the controlled-rectifier switching network in the FIG. 1 control circuit, to permit controlling the direction of motor motion of a permanent-magnet d.c. motor.

The split-wound field motor 5 can be replaced by a permanent magnet d.c. motor 123, by substituting between points F and G of FIG. 1, for 5, 15, 17, 19, 27, 29 the circuit of FIG. 3. Operation of the circuit of FIG. 1 will be as previously described with the exception of the operation of the circuit of FIG. 3, as follows. The operation for the condition where the potential at point F goes high with that at point G low, enables conduction of GTO's 129 and 131, for operating the motor 123 in one direction by passing current through the winding of the motor 123 in one direction via a first conduction path (between terminal 127 to which a potential +V is applied and ground) including GTO's 129 and 131, and motor 123. When the potential at point F goes low, GTO's 129 and 131 are disabled for conduction, interrupting the first conduction path, causing the motor 123 to stop.

The operation for the condition where the potential at point G goes high with that at point F low, enables conduction of GTO's 125 and 133, for operating the motor 123 in an opposite direction, by passing current through the rotor winding of the motor in an opposite direction via a second conduction path (between terminal 127 and ground) including GTO's 125 and 133, and motor 123. When the potential at point G goes low, GTO's 125 and 133 are disabled from conduction, interrupting the second current path, stopping the motor 123. If desired, conventional silicon-controlled-rectifiers can be substituted for either or both GTO's 131 and 133.

What is claimed is:

1. A circuit for controlling a motor from any of a plurality of control stations, comprising:

first and second operator-actuated switch means at first and second of said control stations, respectively, each of said switch means susceptible of being selectively placed into any of first, second and third conditions;

a first controlled rectifier of the gate-turn-off type having an anode-to-cathode path connected for selectively conducting current to said motor for moving its movable part in a first direction and having a gate electrode for receiving a first turn-on signal to render its anode-to-cathode path conductive or for receiving a first turn-off signal to render its anode-to-cathode path non-conductive;

a second controlled rectifier of the gate-turn-off type having an anode-to-cathode path connected for selectively conducting current to said motor for moving its movable part in a second direction and having a gate electrode for receiving a second turn-on signal to render its anode-to-cathode path conductive or for receiving a second turn-off signal to render its anode-to-cathode path non-conductive;

means for generating said first turn-on signal in response to at least one of said first and said second switch means being in its first condition and the other being in other than its second condition;

means for generating said second turn-on signal in response to at least one of said first and said second switch means being in its second condition and the other being in other than its first condition; and means for generating said first and said second turn-off signals in response to either of said first and said second switch means being displaced from its first or second condition to its third condition while the other is in its third condition, or in response to one of said first and said second switch means being displaced to its first condition while the other is in its second condition, or in response to one of said first and said second switch means being displaced to its second condition while the other is in its first condition.

2. A circuit for controlling a motor as set forth in claim 1 connected in combination with a motor having a movable part and having a split-field winding with first and second portions, said circuit further including a source of field-energizing voltage, with the anode-to-cathode path of said first controlled rectifier being connected to selectively apply said source of field-energizing voltage across said first portion of said split-field winding to cause the movable part of said motor to move in said first direction, and with the anode-to-cathode path of said second controlled rectifier being connected to selectively apply said source of field-energizing voltage across said second portion of said split-field winding to cause the movable part of said motor to move in said second direction.

3. A circuit for controlling a motor as set forth in claim 1 connected in combination with a motor having first and second motor terminals for application of direct current energization and having a movable part that moves in a direction dependent on the polarity of said direct current energization; said circuit further including a source of direct energizing potential between first and second supply terminals; and third and fourth controlled rectifiers, said third controlled rectifier having a gate electrode connected to receive said first turn-on signal and having an anode-to-cathode path rendered conductive in response to said first turn-on signal, said fourth controlled rectifier having a gate electrode connected to receive said second turn-on signal and having an anode-to-cathode path rendered conductive in response to said second turn-on signal, the anode-to-cathode paths of said first and said third controlled rectifiers being disposed to connect the first and second motor terminals respectively to said first supply terminal and to said second supply terminal, and the anode-to-cathode paths of said second and said fourth controlled rectifiers being disposed to connect the second and first motor terminals respectively to said first supply terminal and to said second supply terminal.

4. A circuit for controlling a motor from any of a plurality of control stations, comprising:

first and second operator-actuated switch means at first and second of said control stations, respectively, each of said switch means susceptible of being selectively placed into any of first, second and third conditions;

a first controlled rectifier of the gate-turn-off type having an anode-to-cathode path connected for selectively conducting current to said motor for moving its movable part in a first direction and having a gate electrode for receiving a first turn-on signal to render its anode-to-cathode path conductive or for receiving a first turn-off signal to render its anode-to-cathode path non-conductive;

a second controlled rectifier of the gate-turn-off type having an anode-to-cathode path connected for selectively conducting current to said motor for moving its movable part in a second direction and having a gate electrode for receiving a second turn-on signal to render its anode-to-cathode path conductive or for receiving a second turn-off signal to render its anode-to-cathode path non-conductive; logic means for providing a first output signal at a first output terminal when at least one of said first and second switch means is in said first condition and the other is not in said second condition, and for providing a second output signal at a second output terminal when at least one of said first and second switch means is in said second condition and the other is not in said first condition;

means responsive to discontinuations of said first or said second output signals for supplying trigger signals;

monostable multivibrator means having a triggering terminal connected to receive said trigger signal and having at least one output terminal at which a third output signal is supplied for a given duration responsive to each said trigger signal;

first gate signal generator means responsive to said third output signal for supplying said first turn-off signal and responsive to said first output signal for supplying said first turn-on signal; and second gate signal generator means responsive to said third output signal for supplying said second turn-off signal and responsive to said second output signal for supplying said second turn-on signal.

5. The motor control circuit of claim 4 wherein said means for supplying trigger signals includes:

a logic gate connected to receive at first and second input terminals thereof said first and said second output signals, respectively, and arranged to provide at an output terminal thereof an output response to neither or both of said first and said second output signals; and a network with series arm capacitor and shunt-leg resistor, differentiating the output response of said logic gate for supplying said trigger signals.

6. The motor control network of claim 4, wherein said first and second gate signal generator means each includes:
respective first and second transistors of like conductivity, each having an emitter electrode connected to a terminal for receiving an operating voltage, a base electrode, and a collector electrode;
a respective third transistor of opposite conductivity to said first and second transistors, having a collector electrode connected to the collector electrode of said second transistor, an emitter electrode, and a base electrode coupled to the collector electrode of said first transistor; and
a respective blocking diode connected between said emitter electrode of said third transistor and a terminal for receiving a reference potential and poled for forward conduction of current flowing through said emitter electrode of said third transistor;
and wherein said first transistors of said first and second gate signal generator means each have their collector electrodes coupled to the terminal for receiving said reference voltage, their base electrodes coupled in common to said output terminal of said multivibrator means, and their collector electrodes respectively coupled as said first and second output terminals of said logic means;
and wherein said second transistors of said first and second gate signal generator means have their collector electrodes coupled individually to the gate electrodes of said first and second controlled rectifiers, respectively, and have their base electrodes coupled individually to said first and second output terminals, respectively, of said logic means.

7. A control circuit for a direct current motor, comprising:
first and second switch means, each being operable to one of first and second conditions, for opposite directions of operation of said motor, respectively, and to a neutral condition for de-energizing said motor;
logic means responsive to the condition of said first and second switch means, for providing a first output signal when at least one of said first and second switch means is in its first condition and the other is not in its second condition, and for providing a second output signal when at least one of said first and second switch means is in its second condition and the other is not in its first condition;
means responsive to the discontinuation of either said first or second output signals, for providing a third output signal; and
motor drive means responsive to said first output signal for supplying current to said motor through a first current path, or responsive to said second output signal for supplying current to said motor through a second current path, or responsive to said third output signal for discontinuing the flow of current to said motor.

8. The control circuit of claim 7, wherein said first and second switch means each include a single-pole-double-throw switch with neutral position, each switch having its pole connected to a terminal for receiving a reference potential, and having first and second contacts, the first and second conditions of said switch being when said pole is switched to said first contact or said second contact, respectively, the neutral condition of said switch being when said pole is switched to a position for not contacting either of said first or second contacts.

9. The control circuit of claim 7 wherein siad logic means includes:
first through fourth inverters, each having an input and an output terminal;
a plurality of input pull-up resistors, individual ones of which are connected between a terminal for receiving an operating voltage and an input terminal of said first through fourth inverters, respectively, said first and second inverters also having their input terminals connected individually to said first and second contacts, respectively, of said first switch and said third and fourth inverters also having their input terminals connected individually to said first and second contacts, respectively, of said second switch;
first gating means responsive to the voltage levels at the output terminals of said second and fourth inverters, and at the first and second contacts of said first and second switches, for providing said first output signal when the pole of at least one of said first and second switches is switched to said first contact; and
second gating means responsive to the voltage levels at the output terminals of said first and third inverters, and at the first and second contacts of said first and second switches, for providing said second output signal when the pole of at least one of said first and second switches is switched to said second contact.

10. The control circuit of claim 7, wherein said means for providing a third output signal includes:
an exclusive NOR gate having a pair of input terminals receptive of said first and second output signals, respectively, and an output terminal from which an output signal is supplied responsive to the discontinuance of said first or second output signals; and
monostable multivibrator means having an input terminal coupled to said output terminal of said exclusive NOR gate, and being responsive to the output signal from said exclusive NOR gate, for providing said third output signal of predetermined duration.

11. The control circuit of claim 7, wherein said motor is a split-wound field motor including a forward direction power terminal, a reverse direction power terminal, and a terminal for connection to a point of reference potential, and said motor drive means includes:
first gate signal generator means responsive to said first output signal for providing a forward direction drive signal, and responsive to said third output signal, for providing a first motion-inhibit signal;
second gate signal generator means responsive to said second output signal, for providing a reverse direction drive signal, and responsive to said third output signal, for providing a second motion-inhibit signal;
first bistable switching means having a main current path connected between a terminal for receiving an operating voltage and said forward direction power terminal of said motor, and having a control electrode responsive to said forward direction drive signal, for lowering the relative impedance of said main current path, thereby permitting the flow of current therethrough to operate said motor in the forward direction, and responsive to said first motion-inhibit signal, for increasing the relative impedance of said main current path, preventing the flow of current therethrough, allowing said motor to stop; and second bistable switching means having a main current path connected between a terminal for receiving an operating voltage and said reverse direction power terminal of said motor, and having a control electrode responsive to said reverse direction drive signal, for lowering the relative impedance of its main current path, thereby permitting the flow of current therethrough to operate said motor in the reverse direction, and responsive to said second motioninhibit signal for increasing the relative impedance of its main current path, preventing the flow of current therethrough allowing said motor to stop.

12. The control circuit of claim 11, wherein said first and second bistable switching means each include a gate-turn-off silicon controlled rectifier having an anode and cathode electrodes, forming said main current path, and having a gate electrode as said control electrode.

13. The control circuit of claim 7, wherein said motor is a permanent magnet motor having first and second operating terminals, and said motor drive means includes:

first gate signal generator means responsive to said first output signal, for providing a forward direction drive signal, and responsive to said third output signal, for providing a first motion-inhibit signal;

second gate signal generator means responsive to said second output signal, for providing a reverse direction drive signal, and responsive to said third output signal, for providing a second motion-inhibit signal;

first bistable switching means and first controlled rectifier means each having a main current path connected in a first series circuit with the first and second terminals of said motor connected individually to and between the main current paths, an operating voltage being applied across the first series circuit, and each having a control electrode responsive to said forward direction drive signal, for enabling conduction of their main current paths for operating said motor in the forward direction, the control electrode of said first bistable switching means being responsive to the first motion-inhibit signal, for disabling conduction of its associated main current path, thereby allowing said motor to stop and turning off said first controlled rectifier, if enabled; and second bistable switching means and second controlled rectifier means each having a main current path connected in a second series circuit with the first and second terminals of said motor connected individually to and between the main current paths, said operating voltage being applied across this second series circuit, and each having a control electrode responsive to said reverse direction drive signal, for enabling conduction of their main current paths for operating said motor in the reverse direction, the control electrode of said second bistable switching means being responsive to the second motion-inhibit signal, for disabling conduction of its associated main current path, thereby stopping said motor and turning off said second controlled rectifier, if enabled.

14. The control circuit of claim 13, wherein said first and second bistable switching means are each provided by a gate-turn-off silicon controlled rectifier, each having an anode electrode for receiving said operating voltage, a cathode electrode connected individually to said first and second operating terminals of said motor, respectively, and a gate electrode as said control electrode; and wherein said first and second controlled rectifier means are each provided by a gate-turn-off silicon controlled rectifier, each having an anode electrode individually connected to said second and first operating terminals of said motor, respectively, a cathode electrode connected to a point of reference potential, and a gate electrode as the control electrode.

15. The control circuit of claim 13, wherein said first and second bistable switching means are each provided by a gate-turn-off silicon controlled rectifier, each having an anode electrode for receiving said operating voltage, a cathode electrode connected individually to said first and second operating terminals of said motor, respectively, and a gate electrode as said control electrode; and wherein said first and second controlled rectifier means are each provided by a silicon controlled rectifier, each having an anode electrode individually connected to said second and first operating terminals of said motor, respectively, a cathode electrode connected to a point of reference potential, and a gate electrode as the control electrode.

16. A control circuit for a bi-directional d.c. motor including at least two power terminals, and a common terminal for connection to a point of reference potential, comprising:

a pair of manually operable switches, each one of which can be placed in a first condition, a second condition or a neutral condition;

logic means responsive to the condition of said switches for providing a first output signal when at least one of said switches is in said first condition and the other is not in its second condition, and a second output signal when at least one of said switches is in said second condition and the other is not in its first condition;

means responsive to the discontinuation of either said first or second output signals, for providing a third output signal of predetermined duration;

first and second gate signal generator means individually responsive to said first and second output signals, respectively, for providing first and second turn-on signals, respectively, and each substantially simultaneously responsive to said third output signal for terminating its respective turn-on signal, if any, and thereafter providing a turn-off signal;

a d.c. source of voltage; and first and second bistable switching means each having a main current path individually connected between said respective power terminals of said motor and said d.c. source of voltage, and each having a control electrode receptive of said first and second turn-on signals, respectively, for permitting current flow through said main current path to rotate said motor in opposite directions, respectively, or receptive of said turn-off signal for terminating the flow of current through its associative main current path to stop said motor.

17. The control circuit of claim 16, wherein said means for providing said third output signal, includes:
  gating means responsive to the termination of either said first or second output signals for producing a trigger signal; and
  a monostable multivibrator having an input terminal receptive of said trigger signal, for producing in response thereto, said third output signal.

18. The control circuit of claim 17, wherein said gating means includes:
  an exclusive NOR gate having a pair of input terminals separately connected to receive said first and second output signals, and having an output terminal;
  a coupling capacitor connected between said output terminal of said exclusive NOR gate and the input terminal of said monostable multivibrator; and
  resistive means connected between said input terminal of said monostable multivibrator, and said point of reference potential.

19. The control circuit of claim 16, wherein said first gate signal generator means, includes:
  first switching transistor means having a main current path coupled between a terminal for receiving an operating voltage and said control electrode of said first bistable switching means, and having a control electrode receptive of said first output signal, for lowering the relative impedance of said main current path of said first switching transistor means; and
  second switching transistor means having a main current path coupled between a terminal for receiving said reference voltage and said control electrode of said first bistable switching means, and having a control electrode receptive of said third output signal, for lowering the relative impedance of said main current path of said second switching transistor means.

20. The control circuit of claim 16, wherein said second gate signal generator means, includes:
  first switching transistor means having a main current path coupled between a terminal for receiving an operating voltage and said control electrode of said second bistable switching means, and having a control electrode receptive of said second output signal, for lowering the relative impedance of said main current path of said first switching transistor means; and
  second switching transistor means having a main current path coupled between a terminal for receiving said reference voltage and said control electrode of said second bistable switching means, and having a control electrode receptive of said third output signal, for lowering the relative impedance of said main current path of said second switching transistor means.

21. The control circuit of claim 16, wherein said first and second bistable switching means each include a gate-turn-off silicon controlled rectifier having anode and cathode electrodes forming said main current path, and a gate electrode as said control electrode.

22. In an automotive vehicle, a circuit for controlling the operation of a motor for raising and lowering any particular window associated with a passenger, from both the driver and passenger positions, comprising:
  driver and passenger switches each being of the single-pole-double-throw type and having a pole connected to a terminal for receiving a reference potential with first and second contacts each being resistively coupled to a terminal for receiving an operating voltage, each said switch being manually operable to first and second conditions for operating said motor to raise and lower said window, respectively, and to a neutral condition for stopping said motor and movement of said window; said first, second, and neutral conditions of each said switch being represented by said pole being switched into electrical contact with said first or second contacts, or to a position not contacting either of said contacts, respectively;
  first through fourth digital inverters each having an input terminal separately connected to said contacts of said driver and passenger switches and each having an output terminal;
  first and second AND gates each having a plurality of input terminals, and each having an output terminal;
  first NAND gate means having a plurality of output terminals each separately connected to said input terminals of said first AND gate, and having a plurality of input terminals, particular combinations of which are receptive of particular ones of the voltage levels at said contacts of said driver and passenger switches, and at said output terminals of said second and fourth inverters, for causing said first AND gate to provide a first control signal at its output terminal, in response to either or both of said driver and passenger switches being placed in said first condition, and responsive to said driver and passenger switches being placed one in its first condition and the other in its second condition, for inhibiting said first AND gate from providing the first control signal;
  second NAND gate means having a plurality of output terminals each separately connected to said input terminals of said second AND gate, and having a plurality of input terminals, particular combinations of which are receptive of particular ones of the voltage levels at said contacts of said driver and passenger switches, and at said output terminals of said first and third inverters, for causing said second AND gate to provide a second control signal at its output terminal, in responsive to either or both of said driver and passenger switches being placed in said second condition, and responsive to said driver and passenger swtiches being placed one in its first condition and the other in its second condition, for inhibiting said second AND gate from providing the second control signal;
  at least first and second bistable switches each having a control electrode and a main current path, each said main current path being separately connected in seires circuits with said motor and a d.c. operating voltage being applied across each series circuit; and
  gate signal generator means connected between the control electrodes, respectively, of said first and second bistable switches, and the output terminals of said first and second AND gates, respectively, responsive to said first and second control signals, for providing said raise and lower signals, respectively, to turn on the associated one of the bistable switches.

23. The control circuit of claim 22, and further including:

means responsive only to discontinuation of at least one of said first and second control signals, for providing a triggering signal; and multivibrator means responsive to said triggering signal, for producing a third control signal for operating said gate signal generator means to produce a motor stop signal.

24. The control circuit of claim 23, wherein said means for providing a triggering signal includes:

an exclusive NOR gate having a pair of input terminals connected to said output terminals of said first and second AND gates, respectively, and having an output terminal;

a capacitor coupled between said output terminal of said exclusive NOR gate and said multivibrator means; and a resistor connected between the common connection of said capacitor and multivibrator means, and a terminal for receiving said reference potential, said triggering signal being provided at the common connection of said resistor and capacitor, for a predetermined maximum period of time, for each operation of said exclusive NOR gate.

25. The control circuit of claim 23, wherein said multivibrator means includes a monostable multivibrator having an input terminal receptive of said triggering signal, and an output terminal connected to said gate signal generator means, said third control signal being developed at this output terminal.

26. The control circuit of claim 22, wherein said gate signal generator means includes:

first and second transistorized switching means each having a normally-open current conduction path coupled between a terminal for receiving said operating voltage and the control electrode of an individual one of said pair of bistable switches, respectively, and each having a control electrode receptive of said first and second control signals, respectively, for closing said current conduction path, thereby turning on said associated bistable switch; and third and fourth transistorized switching means each having a normally-open current conduction path coupled between a terminal for receiving said reference potential and an individual one of the control electrodes of said pair of bistable switches, respectively, and each having a control electrode receptive in common of said third control signal, for closing said associated current conduction paths, thereby turning off the conductive one of said pair of bistable switches, if any, to de-energize or maintain said motor in a de-energized state.

27. The control circuit of claim 22, wherein said first and second bistable switches each include a gate turn-off silicon controlled rectifier having anode and cathode electrodes forming said main current path, and having a gate electrode as said control electrode.

28. The control circuit of claim 27, wherein said motor is provided by a split wound field direct current motor having first and second operating terminals individually connected to the cathode electrodes of said first and second gate-turn-off silicon controlled rectifiers, respectively, and a common terminal connected to a point of reference potential.

29. The control circuit of claim 22, further including: first and second unidirectional switches each having a control electrode, and a main current path, the main current path of said first unidirectional switch being connected in one series circuit with said motor and the main current path of said first bistable switch, the main current path of said second unidirectional switch being connected in another series circuit with said motor and the main current path of said second bistable switch, the control electrodes of said first bistable switch and first unidirectional switch being connected together, and the control electrodes of said second bistable switch and second unidirectional switch being connected together.

30. The control circuit of claim 29, wherein said first and second bistable, and first and second unidirectional switches are each provided by first through fourth gate-turn-off silicon controlled rectifiers, respectively, each having a gate electrode as said control electrode, and anode and cathode electrodes forming said main current path.

31. The control circuit of claim 30, wherein said motor is provided by a permanent magnet direct current motor having a first operating terminal connected in common to the cathode and anode electrodes of said first and third gate-turn-off silicon controlled rectifiers, respectively, and a second operating terminal connected in common to the cathode and anode electrodes of said fourth and second gate-turn-off silicon controlled rectifiers, respectively.

32. The control circuit of claim 29, wherein said first and second bistable switches are each provided by first and second gate-turn-off silicon controlled rectifiers, each having a gate electrode as said control electrode, and anode and cathode electrodes forming said main current paths, respectively; and said first and second unidirectional switches are each provided by silicon controlled rectifiers, each having a gate electrode as their control electrode, and anode and cathode electrodes forming their main current paths.

33. The control circuit of claim 32, wherein said motor is provided by a permanent magnet direct current motor having a first operating terminal connected in common to the cathode and anode electrodes of said first gate-turn-off silicon controlled rectifier and first silicon controlled rectifier, respectively, a second operating terminal connected in common to the cathode and anode electrodes of said second gate- turn-off silicon controlled rectifier and second silicon controlled rectifier, respectively.

* * * * *